US011384914B2

(12) United States Patent
Mejean (10) Patent No.: US 11,384,914 B2
(45) Date of Patent: Jul. 12, 2022

(54) LENS, WORK LIGHT INCLUDING SUCH A LENS, AND VEHICLE

(71) Applicant: VIGNAL SYSTEMS, Corbas (FR)

(72) Inventor: Laurent Mejean, Corbas (FR)

(73) Assignee: VIGNAL SYSTEMS, Corbas (FR)

( * ) Notice: Subject to any disclaimer, the term of this patent is extended or adjusted under 35 U.S.C. 154(b) by 0 days.

(21) Appl. No.: 17/199,643

(22) Filed: Mar. 12, 2021

(65) Prior Publication Data

US 2021/0317964 A1 Oct. 14, 2021

(30) Foreign Application Priority Data

Mar. 12, 2020 (FR) ...................................... 20/02444

(51) Int. Cl.
| | |
|---|---|
| *F21S 41/255* | (2018.01) |
| *F21S 41/657* | (2018.01) |
| *B60Q 1/24* | (2006.01) |
| *F21V 5/04* | (2006.01) |
| *G02B 19/00* | (2006.01) |
| *F21Y 115/10* | (2016.01) |
| *F21S 41/143* | (2018.01) |
| *F21W 102/17* | (2018.01) |

(52) U.S. Cl.
CPC .............. *F21S 41/255* (2018.01); *B60Q 1/24* (2013.01); *F21S 41/657* (2018.01); *F21V 5/04* (2013.01); *G02B 19/0014* (2013.01); *F21S 41/143* (2018.01); *F21W 2102/17* (2018.01); *F21Y 2115/10* (2016.08)

(58) Field of Classification Search
CPC .... F21V 5/04; F21V 5/045; F21V 5/08; F21S 41/255; F21S 41/657; F21S 41/265; F21S 41/143; F21S 41/25; F21S 41/26; F21S 41/27; F21S 41/285; B60Q 1/24; B60Q 1/245; F21W 2102/17; F21W 2102/40; F21Y 2115/10; G02B 19/0014
See application file for complete search history.

(56) References Cited

U.S. PATENT DOCUMENTS

| 10,429,021 B2 * | 10/2019 | Iwasaki ................. F21S 41/265 |
| 2011/0002126 A1 * | 1/2011 | Chen ......................... F21V 5/04 |
| | | 362/296.01 |
| 2014/0204218 A1 * | 7/2014 | Gebhard ................. B60R 11/04 |
| | | 348/164 |

FOREIGN PATENT DOCUMENTS

| EP | 2816277 | 12/2014 |
| FR | 2992738 | 1/2014 |

OTHER PUBLICATIONS

Search report issued to French counterpart application No. 2002444, completed Oct. 27, 2020.

* cited by examiner

*Primary Examiner* — Erin Kryukova
(74) *Attorney, Agent, or Firm* — Burris Law, PLLC (57) ABSTRACT

An input face of a lens includes an upper portion configured to divert the light rays so that they are substantially parallel to the horizontal midplane (P2), and a lower portion configured to reduce the vertical opening angle ($\alpha$) of the light beam, according to the vertical axis (Z). The output face of the lens includes a central vertical portion substantially planar and orthogonal to the optical axis. On either side of the central vertical portion, a lateral portion is configured to divert each light ray in the direction of the vertical midplane (P1), according to an amplitude of deflection that is even larger as the point of incidence of the light ray on said lateral portion is close to the vertical midplane (P1).

14 Claims, 6 Drawing Sheets

LENS, WORK LIGHT INCLUDING SUCH A LENS, AND VEHICLE

CROSS-REFERENCE TO RELATED APPLICATIONS

This application claims priority to and the benefit of FR 20/02444 filed on Mar. 12, 2020. The disclosure of the above application is incorporated herein by reference.

FIELD

The present disclosure relates to a lens intended to be placed on a work light comprising a plurality of light sources and a vehicle, in particular a heavy vehicle such as a truck, comprising at least one such a work light.

BACKGROUND

The statements in this section merely provide background information related to the present disclosure and may not constitute prior art.

Some vehicles are equipped with a work light, that is to say a case containing light sources adapted to light up the desired area, such as a spotlight. Quite particularly, this concerns heavy vehicles such as trucks, in particular vehicles including a rear container where objects shall be loaded and from which objects shall be unloaded. In particular, these may consist of delivery vehicles equipped with a liftgate, whether refrigerated or not, garbage trucks, etc. For these loading/unloading operations to be properly performed, without any particular difficulty, it is preferable to light up the work area, and even more so as these vehicles are often used early at morning, when there is still some darkness. Work lights may also equip construction machinery.

Traditionally, a work light includes a case which is mounted on the vehicle via a support. The support may be designed so as to allow tilting the case, in order to direct the light beam properly so as to obtain a satisfactory lighting of the work area.

Because of its function, the work light shall produce lighting with enough intensity to light up the desired area. That is why, despite the aforementioned design enabling tilting, in particular towards the ground, work lights remain, most often, very dazzling for persons moving around the vehicle. This is very unpleasant, and may even entail some risks.

SUMMARY

This section provides a general summary of the disclosure and is not a comprehensive disclosure of its full scope or all of its features.

To this end, and according to a first aspect, the present disclosure concerns a lens having an optical axis extending according to a so-called longitudinal axis (X), intended to be placed on the path of the light rays emitted by a light source so that the optical axis of the lens is parallel to the main axis of emission of the light source. The lens has, in the direction of propagation of the light rays, an input face and an output face, and has a general shape cambered in the direction of the output face. The lens defines a so-called vertical axis (Z), a so-called transverse axis (Y) and further has a so-called vertical first midplane, extending in a plane (X, Z) and a so-called horizontal second midplane, extending in a plane (Y, Z), According to a general definition of the present disclosure, the input face includes:

an upper portion located above the horizontal midplane, which is configured to divert the light rays, at least according to the vertical axis, so that they are substantially parallel to the horizontal midplane;

and a lower portion located below the horizontal midplane, which is configured to reduce the vertical opening angle of the light beam, according to the vertical axis, between the horizontal midplane and a lower limit.

In addition, the output face includes:

a central vertical portion substantially planar and orthogonal to the optical axis;

on either side of the central vertical portion, a lateral portion configured to divert each light ray in the direction of the vertical midplane, according to an amplitude of deflection that is even larger as the point of incidence of the light ray on said lateral portion is close to the vertical midplane.

Thus, thanks to the particular geometry of the input face, the lens according to the present disclosure allows collimating the light received in the upper portion of the lens, parallel to the optical axis, which results in creating for the observer an unilluminated upper area, typically at eye level, and thus considerably limiting dazzling. Furthermore, the lower portion of the input face allows collecting as much of the light emitted by the light source and concentrating it towards an area that is directly useful, that is to say, in the work light application, towards the work area to light up. In addition, the particular geometry of the output face of the lens translates in a distribution of the luminous intensity in the illuminated area according to an uneven distribution, for example a Gauss-type distribution, preferably according to both the vertical axis and the transverse axis. Such a distribution allows obtaining a maximum luminous intensity in the vicinity of the optical axis, and at the same time, a progressive transition towards the less illuminated areas, for a great lighting effectiveness and an enhanced visual comfort for the observer.

Hence, the lens according to the present disclosure allows combining the effectiveness of the work light—through the collection of a very large amount of the light emitted by the light source and the concentration of the collected light mostly towards a main area, in the vicinity of the optical axis—and the visual comfort for persons in proximity to the work light—through the creation of an unilluminated area limiting dazzling and through the distribution, without any abrupt discontinuity, of the luminous intensity around the most illuminated main area.

Another advantage of the present disclosure is that the anti-dazzling effect is obtained by the design of the lens, and therefore does not involve the implementation of obstacles blocking light. This results in a simplification of mounting, a reduced risk of damage of the work light and in a more satisfactory distribution of the luminous intensity in the illuminated area.

The input face may have, in a plane (X, Z), a concave profile forming a boss directed opposite to the output face. For example, the boss is located in the vicinity of the optical axis.

According to at least one form, the input face has a "horse saddle" type shape (that is to say shaped like a hyperbolic paraboloid), the input face having, in a plane (X, Y), a concave profile and, in a plane (X, Z), a convex profile forming a boss directed opposite to the output face.

Depending on the applications, the vertical midplane may be a plane of symmetry of the input face of the lens.

Furthermore, the upper portion and/or the lower portion of the input face may be configured to reduce the horizontal opening angle of the light beam, according to the transverse axis. In this manner, a large portion of the light emitted by the light source may be collected and concentrated, that is to say directed towards the desired area. According to one variation, the light beam is symmetrically reduced with respect to the vertical midplane, that is to say identically on each side of this plane.

Each of the lateral portions of the output face may have a shape that is curved around a vertical axis, the concavity being directed towards the input face, and which has a radius of curvature, in a plane (X, Y), that increases when getting away from the vertical midplane. In other words, the farther from the vertical midplane, the more the shape will be planar. Thus, each of the lateral portions has a substantially cylindrical shape, yet with a variable curvature.

Depending on the applications, the vertical midplane and/or the horizontal midplane may be a plane of symmetry of the output face of the lens.

According to a second aspect, the present disclosure concerns a work light including a case, a plurality of light sources disposed in the case, and a lens as previously described, disposed opposite at least one of the light sources, on the path of the light rays emitted by said light source, and so that the optical axis of the lens is parallel to the main axis of emission of said light source.

According to a third aspect, the present disclosure concerns a vehicle, in particular a heavy vehicle such as a truck, comprising at least one work light as previously described. The work light is mounted on the vehicle by means of a support which is preferably configured to allow tilting the work light about a horizontal axis.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
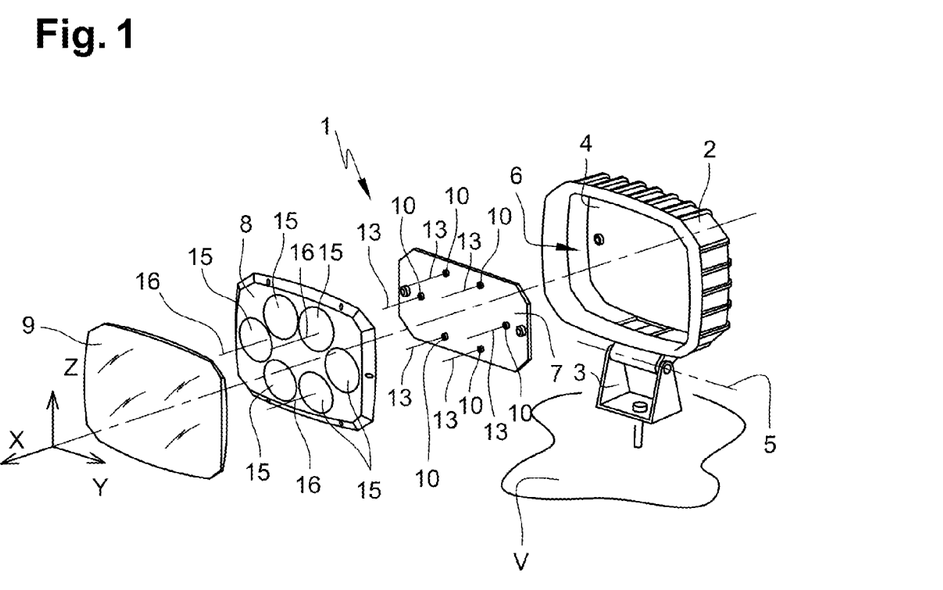
FIG. 1 is an exploded perspective view of a work light including a plurality of lenses in accordance with the teachings of the present disclosure.

FIG. 1 represents a work light 1 in an exploded perspective view. In one form of the present disclosure, the work light 1 includes a case 2 which is mounted on a support 3 which, in turn, is intended to be mounted on a vehicle V, in particular a heavy vehicle such as a truck. For example, the support 3 may be fastened to the vehicle V, whereas the case 2 may be pivotally mounted on the support 3 about a pivot axis 5. The pivot axis 5 may be horizontal and directed transversely, so that the light beam produced by the work light 1 could be tilted towards the ground.

The case may have a bottom wall 4 and, opposite thereto, an open face 6.

In some variations, the work light 1 includes a plurality of light sources 10, which may typically consist of LED (light-emitting diodes). For example, it is possible to have between five and ten light sources in a work light 1. In some forms, the light sources 10 may include a base 11 and a cover 12, and have a main axis of emission 13. The light sources 10 are disposed in the case 2, for example mounted on a plate 7 which, in turn, is fastened in the case 2. In one or more applications, the light sources 10 may be mounted so that their main axes of emission 13 are parallel to one another and for example orthogonal to the open face 6 of the case 2.

Figure 2:
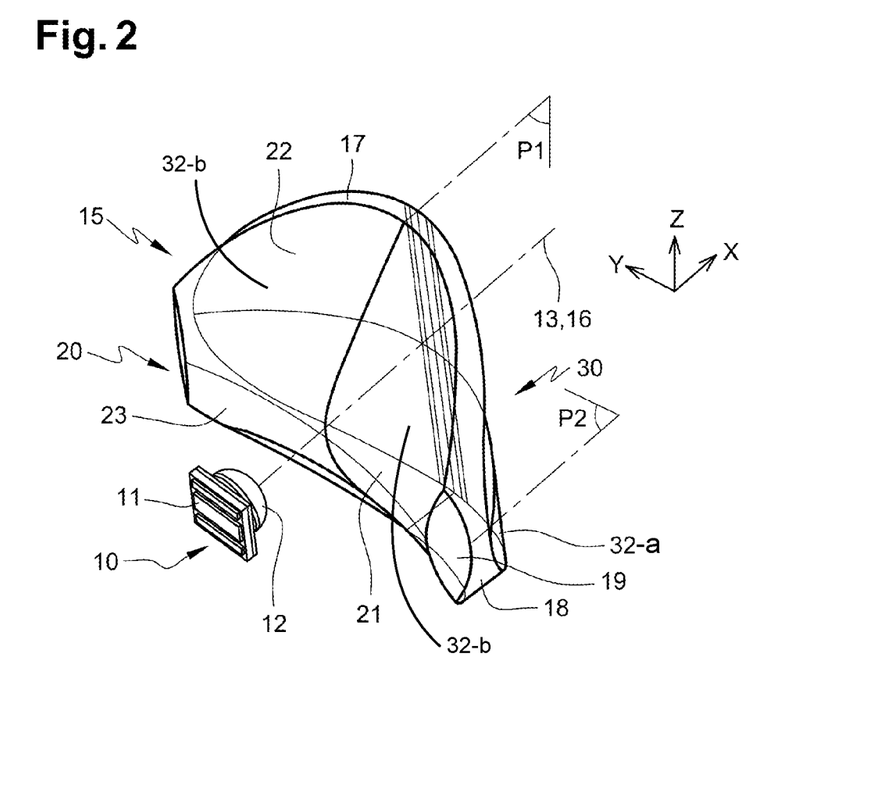
FIG. 2 is a perspective view of a light source and of a lens placed in front of the light source, in accordance with the teachings of the present disclosure.
Figure 3:
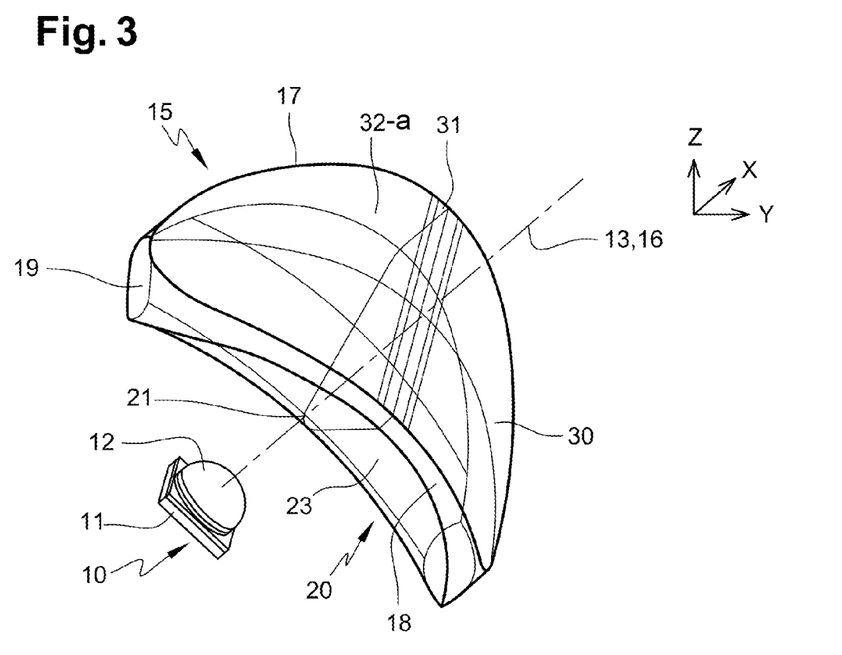
FIG. 3 is a perspective view similar to FIG. 2, according to another viewpoint in accordance with the teachings of the present disclosure.

In one or more aspects, a lens 15 is disposed opposite at least one, and preferably each, of the light sources 10, on the path of the light rays emitted by said light source 10. Each lens 15 has an optical axis 16 and is preferably disposed so that this optical axis 16 is parallel to the main axis of emission 13 of the corresponding light source, or even coincident with this main axis of emission 13. The light source 10 is placed at the focus of the corresponding lens 15.

In some applications, the lenses 15 may be integrated to a transparent wall 8, typically made in one-piece by molding of a plastic material.

Furthermore, in some variations, a glass 9 may be provided opposite the transparent wall 8, to close the open face 6 of the case 2.

In some applications, the work light 1 forms a powerful lighting device, also called work lamp or work spotlight, allowing lighting up an intervention area of an operator to facilitate and secure his work. Depending on needs, the vehicle V may be equipped with several work lights 1.

In one variant, the lens 15 defines a so-called longitudinal axis (X), parallel to the optical axis 16, a so-called vertical axis (Z), and a so-called transverse axis (Y). In the represented variant, the longitudinal axis (X) is orthogonal to the bottom wall 4 of the case 2. The longitudinal axis (X) is horizontal—if the work light 1 is mounted upright, that is to say it has not been pivoted about the pivot axis 5—as well as the transverse axis (Y). Hence, the axis (Z) is disposed vertically. Nonetheless, other orientations may be considered.

The lens 15 has a so-called vertical first midplane P1, extending in a plane (X, Z) and a so-called horizontal second midplane P2, extending in a plane (Y, Z).

The lens 15 has, in the direction of propagation of the light rays, an input face 20, shown more particularly in FIG. 2, and an output face 30, shown more particularly in FIG. 3.

Figure 6:
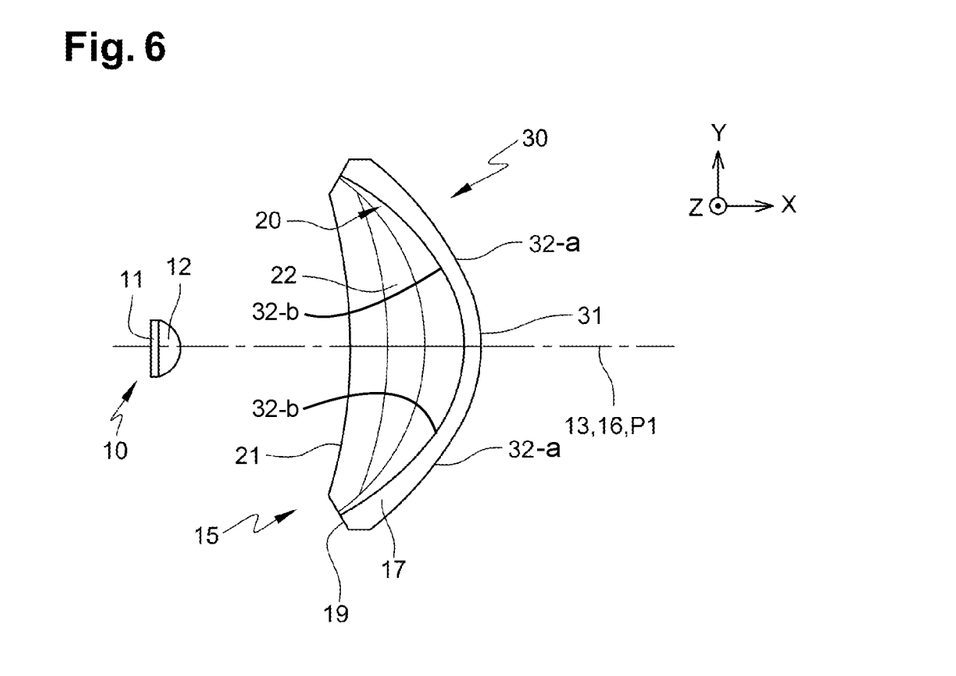
FIG. 6 is a top view of the lens in accordance with the teachings of the present disclosure.
Figure 7:
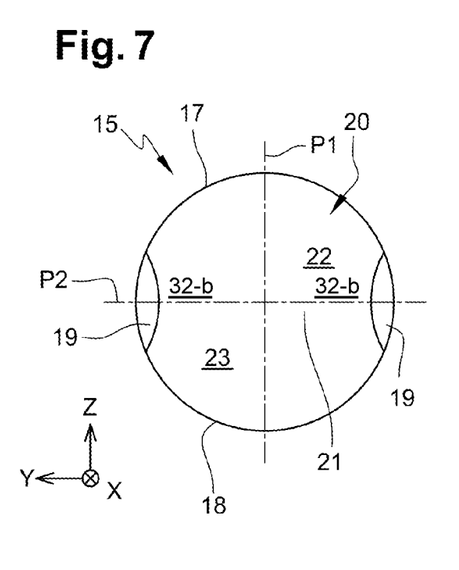
FIG. 7 is a schematic planar view of the input face of the lens in accordance with the teachings of the present disclosure.

The lens 15 has a general shape cambered in the direction of the output face 30. In other words, the lens 15 has a rounded general shape, similar to a cup, but whose shape is not hemispherical. The lens 15 has a circumference which, when viewed according to the optical axis 16, is substantially circular, as illustrated in FIGS. 6 and 7. The circumference includes an upper edge 17 and a lower edge 18 each substantially forming a circle-arc shaped strip, on either side of the horizontal midplane P2; furthermore, a planar surface 19 directed opposite to the output face 30 is formed in the vicinity of the horizontal midplane P2. The planar surface 19 allows avoiding a parasitic total reflection of light in the lens 15.

Figure 4:
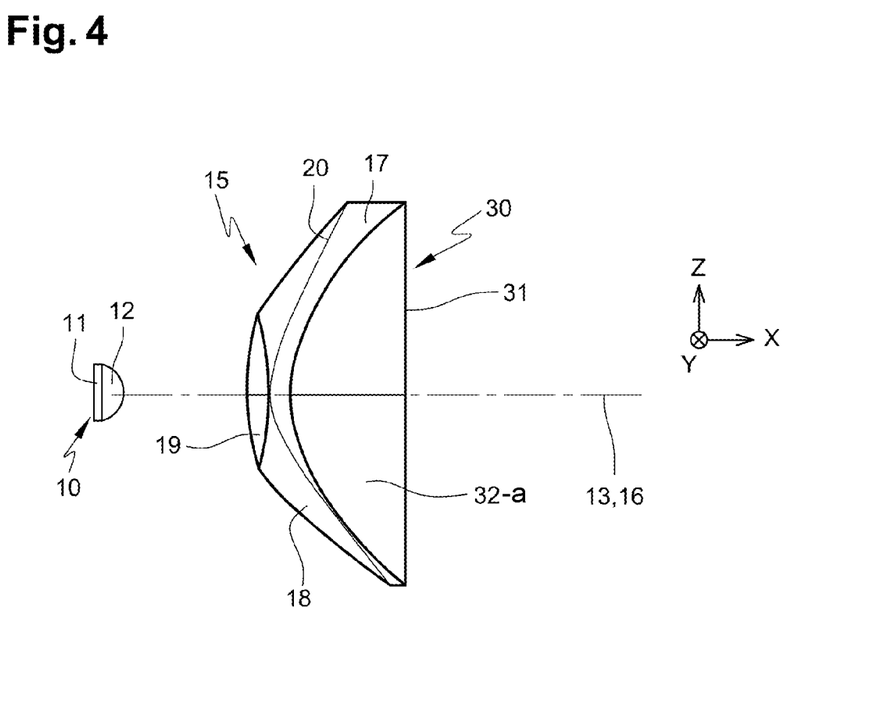
FIG. 4 is a side view of the lens in accordance with the teachings to the present disclosure.
Figure 5:
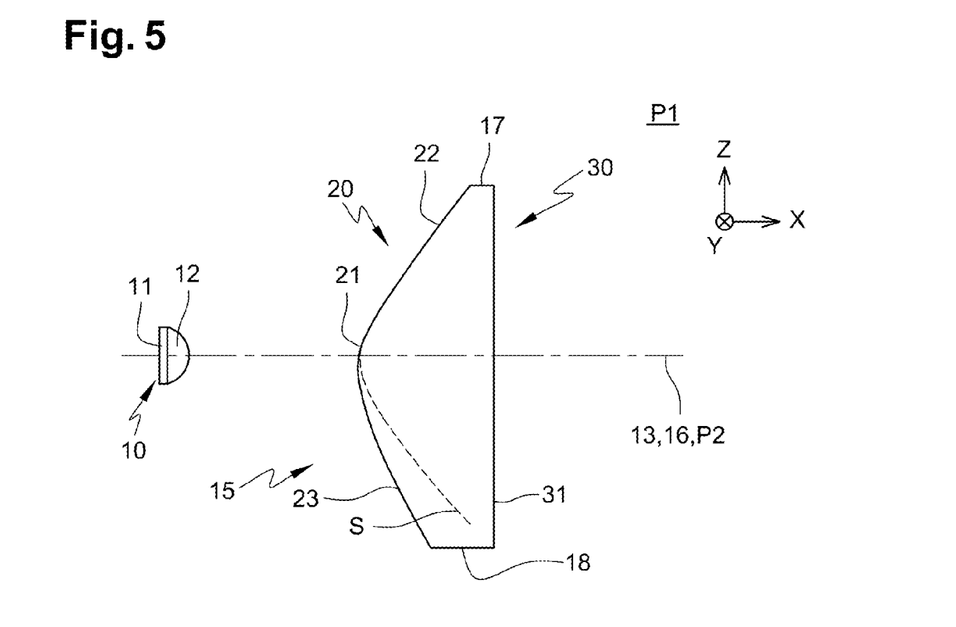
FIG. 5 is a schematic sectional view of the lens, in the vertical midplane, according with the teaching with the present disclosure.

In one form, as shown quite particularly in FIGS. 2, 4 and 5, the input face 20 may have a "horse saddle" type shape, that is to say it may have:

in a plane (X, Y), a concave profile, as illustrated in particular in FIG. 5;

and in a plane (X, Z), a convex profile forming a boss 21 directed opposite to the output face 30, as illustrated in particular in FIG. 4, the boss 21 may be located in the vicinity of the optical axis 16.

In the illustrated application, the vertical midplane P1 is a plane of symmetry of the input face 20 of the lens 15. Nonetheless, for other applications where it is desired to obtain an asymmetrical lighting, an asymmetrical configuration with respect to this plane P1 may be considered.

In contrast, the horizontal midplane P2 is not a plane of symmetry of the input face 20.

In one variation, in order to limit dazzling generated by the light source 10, the input face 20 includes an upper portion 22, located above the horizontal midplane P2, which is configured to divert the light rays received in said upper portion 22, at least according to the vertical axis (Z), so that these light rays are substantially parallel to the horizontal midplane P2 after their passage through the input face 20.

Moreover, the light beam that is emitted by the light source 10 downwards generates much less dazzling for an observer. That is why the function—and therefore the geometry—of the lower portion 23 of the input face 20 of the lens 15 is different. More specifically, the lower portion 23, located below the horizontal midplane P2, is configured to reduce the vertical opening angle α of the light beam, according to the vertical axis (Z), between the horizontal midplane (P2) and a lower limit. In this manner, the entire light beam received by the lower portion 23 of the input face 20 of the lens 15 is collected and conveyed towards a useful area, that is to say an area that it is desired to light up, instead of being simply transmitted towards areas of lesser interest. Thus, ultimately, a higher luminous intensity will be obtained in the area to light up.

In concrete terms, the upper portion 22 of the input face 20 may extend between the horizontal midplane P2 and the upper edge 17, and the lower portion 23 may extend between the horizontal midplane P2 and the lower edge 18.

According to one form, and as shown in FIG. 5, in a plane (X, Z), at least in the vicinity of the vertical midplane P1, and at a distance from the boss, the upper portion 22 of the input face 20 is substantially planar or has a very large radius of curvature. Furthermore, the lower portion 23 is substantially planar or has a very large radius of curvature, but is not the symmetrical of the upper portion 22 with respect to the optical axis 16. FIG. 5 represents the symmetrical S of the upper portion 22 with respect to the optical axis 16 in dotted lines. More specifically, with regards to this symmetrical, the lower portion 23 may be shifted along the optical axis 16 when getting away from the output face 30, and/or the acute angle formed between said lower portion 23 and the optical axis 16 may be larger than the acute angle formed between said symmetrical S and the optical axis 16.

The input face 20—at the level of the upper portion 22 and/or of the lower portion 23—may be further configured to reduce the horizontal opening angle β of the light beam, according to the transverse axis (Y), that is to say viewed in a plane (X, Y).

Figure 8:
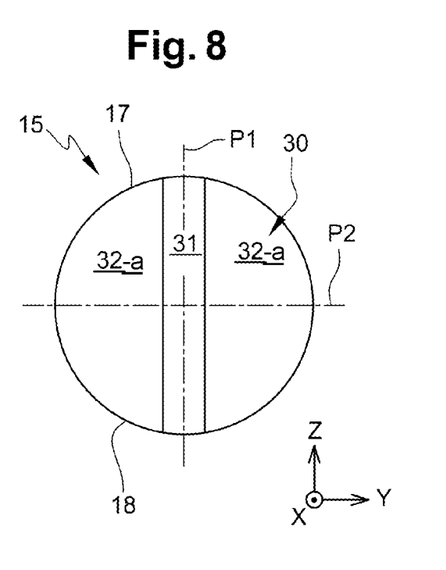
FIG. 8 is a schematic planar view of the output face of the lens in accordance with the teachings of the present disclosure.

As regards the output face 30, shown more particularly in FIGS. 3 and 8, it includes:

a central vertical portion 31 substantially planar and orthogonal to the optical axis 16. The width (according to the axis Y) of the central portion may be comprised, for example, between 10 and 20% of the diameter of the lens 15;

on either side of the central vertical portion 31, a lateral portion 32-a configured to divert each light ray in the direction of the vertical midplane P1, according to an amplitude of deflection that is even larger as the point of incidence of the light ray on said lateral portion 32-a is close to the vertical midplane P1.

Thus, each of the lateral portions 32-a of the output face 30 may have a shape that is curved around a vertical axis, the concavity being directed towards the input face 20, and which has a radius of curvature, in a plane (X, Y), that increases when getting away from the vertical midplane P1.

In the illustrated application, both of the vertical midplane P1 and horizontal midplane P2 are planes of symmetry of the output face 30. Nonetheless, other configurations may be considered.

By substantially preserving the same lighting area as that obtained after passage of the light beam through the input face 20, the output face 30 allows distributing the luminous intensity in an uneven manner, with a maximum intensity in the vicinity of the optical axis 16 of the lens 15 and a progressive decrease of this intensity, without any abrupt transition, when getting away from the optical axis 16.

In some forms of the present disclosure, each of the lateral portions 32-b of the input face 20 may be further configured to modify the vertical opening angle α of the light beam with respect to the optical axis 16, according to the vertical axis (Z), between the horizontal midplane (P2) and a lower limit. Thus, the light rays are diverted when passing from the inside of the lens 15 to the ambient environment, after the output face 30.

This modification may consist of an increase of the vertical opening angle α. Such an arrangement allows increasing the dimension of the area lit up at the exit of the lens 15, based on the spatial concentration performed by the input face 20. A typical application consists in obtaining enough lighting on the ground in the case of a lens 15 belonging to a work light 1.

Alternatively, in one variation, a reduction of the vertical opening angle α of the light beam may be considered, on the contrary, in order to concentrate the light even more towards a more reduced area.

The output face 30 at the level of the lateral portions 32-*a* may be further configured to reduce the horizontal opening angle β of the light beam, according to the transverse axis (Y), that is to say viewed in a plane (X, Y).

Figure 9:
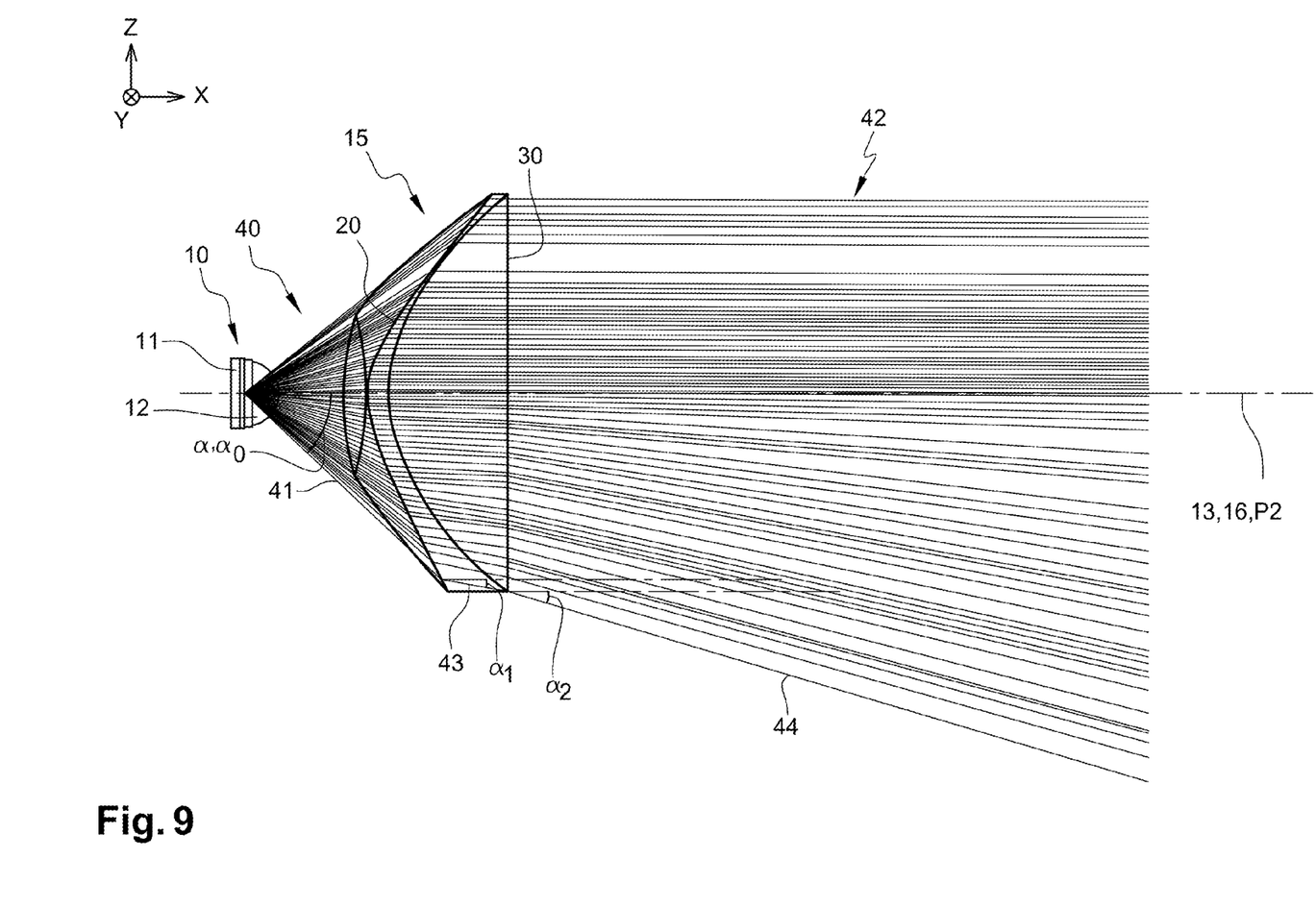
FIG. 9 is an illustrative diagram depicting, in the vertical midplane, the path of the rays emitted by a light source and passing throughout the lens in the vertical midplane in accordance with the teachings of the present disclosure.
Figure 10:
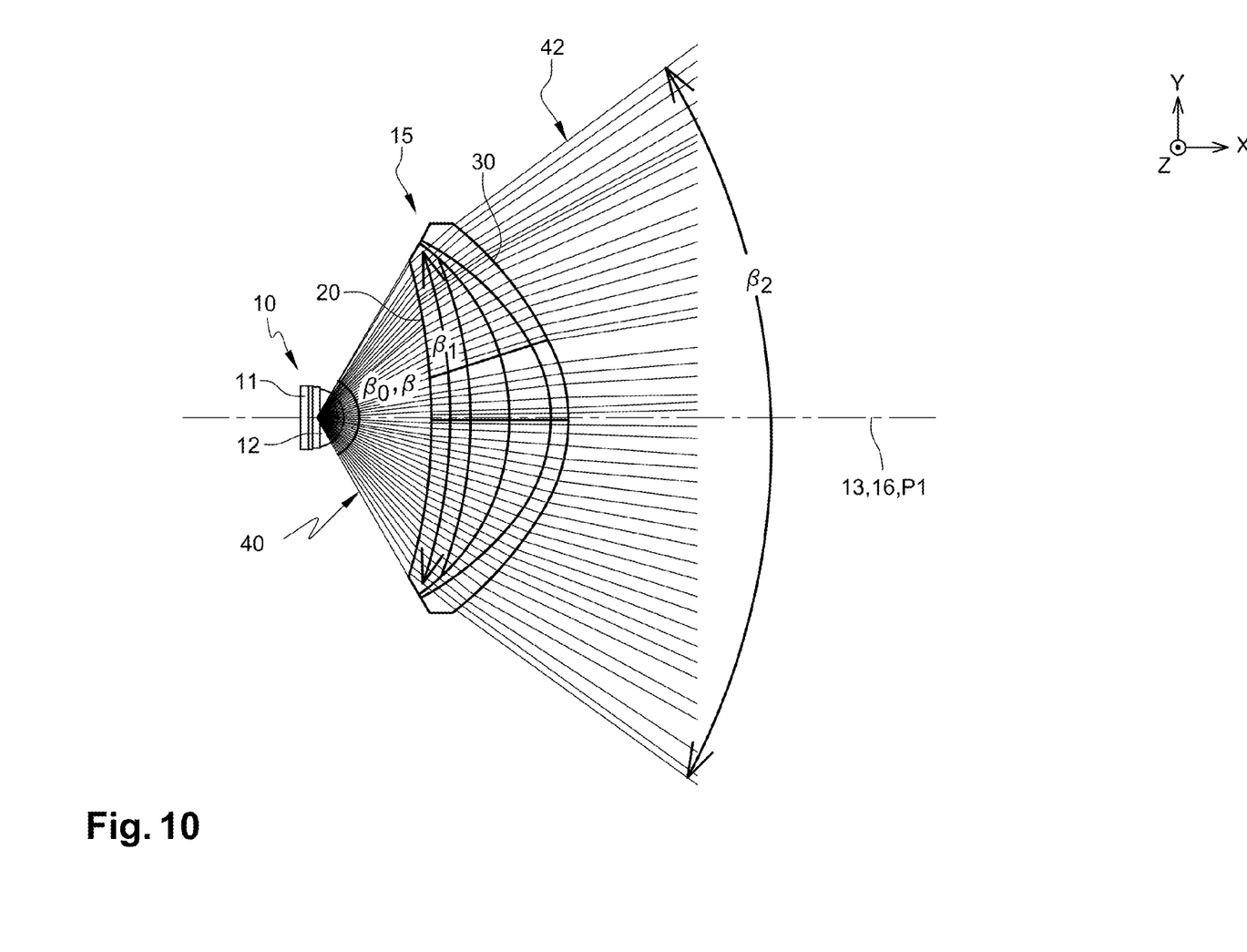
FIG. 10 is an illustrative diagram illustrating, in the horizontal midplane, the path of the rays emitted by a light source and passing throughout the lens in accordance to the teachings of the present disclosure.

Referring now to FIGS. 9 and 10 which illustrate an incident beam 40 emitted by the light source 10 and the deflections undergone by it when it goes through the input face 20 of the lens 15, and then through the output face 30, so as to form the transmitted beam 42.

In a plane (X, Z), as illustrated in FIG. 9, the rays of the incident beam 40 received by the upper portion 22 of the input face 20 are diverted so as to be parallel to the optical axis 16, in the transmitted beam 42, exiting the lens 15. Moreover, the rays of the incident beam 40 received by the lower portion 23 of the input face 20 are diverted towards the optical axis 16, yet while keeping a downward inclination in the transmitted beam 42.

Thus, the lens 15 is configured to reduce the vertical opening angle α of the light beam, according to the vertical axis (Z). In particular, below the horizontal midplane P2:

the lower limit 41 of the incident beam 40 is inclined with respect to the optical axis 16 by an angle α0;

the lower limit 43 of the beam that results from the passage through the input face 20 and which propagates inside the lens 15, is inclined with respect to the optical axis 16 by an angle α1;

and the lower limit 44 of the transmitted beam 42, after passage through the output face, is α2.

The angle α1 is smaller than α0, and the angle α2 is smaller than α0.

For example, for an angle α0 close to 40°, the angle α2 may be in the range of 35% to 50% of α0, for example close to 15 to 20°.

In the represented form, there is a beam convergence after crossing the input face 20 of the lens 15 (that is to say α1<α0) and then a beam divergence when crossing the output face 30 of the lens 15 (that is to say α2>α1). Nonetheless, this form is not restrictive, and it is possible to have α2<α1.

For example, for an angle α0 close to 40°, the angle α1 may be comprised between 15% and 40%, and still between 20% and 35%, and even between 20% and 30% of α0, for example close to 10 to 15°.

In a plane (X, Y), as illustrated in FIG. 10, the rays of the incident beam 40 received by the lens 15 are diverted so that their inclination with respect to the optical axis 16 is reduced. In other words, the horizontal opening angle β of the light beam is reduced. In the represented variant, to the extent that P1 is a plane of symmetry of the lens 15, the horizontal opening angle β of the light beam is symmetrically reduced on either side of P1.

The input face 20 may generate a first reduction of the horizontal opening angle β of the light beam, from β0 to β1. The input face 20 may be designed so as to divert all incident rays received thereby by the same amplitude.

The output face 30 may generate, or not, a modification of the horizontal opening angle of the light beam, from β1 to β2. In contrast, the output face 30 is designed so that the closer the point of incidence of a light ray with the output face 30 to the optical axis 16, the more this ray is diverted towards the optical axis 16 (in the lateral portions 32-*a* of the output face 30).

For example, for an angle β0 close to 120°, the angle β2 may be in the range of 60% to 70% of β0, for example close to 70 to 80°.

Figure 11:
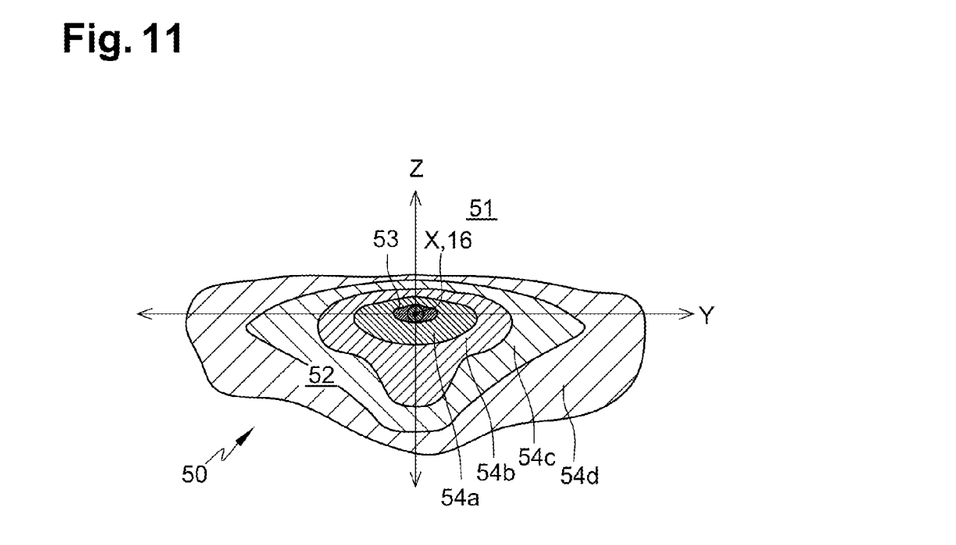
FIG. 11 is an illustrative diagram depicting, the distribution of the luminous intensity obtained after passage of the light beam emitted by the light source throughout the lens in accordance with the teachings of the present disclosure.

FIG. 11 illustrates the light distribution 50 obtained thanks to the lens 15.

On the one hand, because of the upper portion 22 of the input face 20, an unilluminated area 51 is created which is advantageously located at the level of an observer's eyes, thereby producing the pursued anti-dazzling effect.

On the other hand, a localized illuminated area 52 is obtained, the illuminated area being horizontally delimited transversely by the extreme rays of the transmitted beam 42 between angles −β2/2 and +β2/2, and vertically in the lower portion at an angle α2 by the lower limit 44 of the transmitted beam 42.

Because of the variable amplitude of deflection of the light rays by the lens 15, the illuminated area 52 has an uneven light distribution, for example a Gauss-type distribution, on two axes, with:

a central portion 53, in the vicinity of the optical axis 16, having a maximum luminous intensity;

generally annular portions 54*a*, 54*b*, 54*c*, 54*d* . . . with decreasing luminous intensity, it being specified that, although limits between the portions 54*a-d* are represented in FIG. 11, the luminous intensity preferably varies in a continuous manner and not in a staggered manner.

In one or more applications according to the present disclosure, the lens 15 allows collecting a very large amount of the light emitted by the light source 10, that is to say a significant proportion of the emitted light beam. Furthermore, the lens 15 allows concentrating the received incident beam 40 towards an area to be lit up, by the reduction of the vertical and horizontal opening angle of the light beam. It follows that the overall luminous intensity of the area to be lit up is very high, and that the lighting produced in this manner is particularly satisfactory.

The quite particular concentration of light towards the central portion 53 allows obtaining a portion having an intense luminosity, in contrast with an even distribution of light that would result in a too low intensity, barely usable in practice, especially when applied to a work light 1.

Furthermore, the absence of an abrupt transition between areas of different luminosities, quite particularly between a very dark area and a very illuminated area, allows creating a wider luminous area and at the same time being visually more comfortable for an observer.

It goes without saying that the present disclosure is not limited to the variation described hereinabove as example, but it comprises all technical equivalents and variants of the described means as well as combinations thereof.

In particular, it should be noted that the present disclosure has been described in the case where the axis (Z) is vertical, this axis may be positioned differently, the unilluminated area 51 then no longer being positioned above a horizontal plane.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A lens having an optical axis extending according to a longitudinal axis (X), intended to be placed on a path of a plurality of light rays emitted by a light source so that the optical axis of the lens is parallel to a main axis of emission of the light source, the lens having, in a first direction of propagation of the plurality of light rays, an input face and an output face, and having a general shape cambered in a second direction of the output face, the lens defining a vertical axis (Z), a transverse axis (Y) and further having a vertical first midplane (P1), extending in a first plane (X, Z) and a horizontal second midplane (P2), extending in a second plane (Y, Z), wherein the input face includes:
   an upper portion located above the horizontal second midplane (P2), which is configured to divert the plurality of light rays, at least according to the vertical axis (Z), so that the plurality of light rays are substantially parallel to the horizontal second midplane (P2); and
   a lower portion located below the horizontal second midplane (P2), which is configured to reduce a vertical opening angle (α) of a light beam, according to the vertical axis (Z), between the horizontal second midplane (P2) and a lower limit,
   wherein the output face includes:
   a central vertical portion substantially planar and orthogonal to an optical axis; and
   on either side of the central vertical portion, a lateral portion configured to divert each light ray in a third direction of the vertical first midplane (P1), according to an amplitude of deflection that is larger as a point of incidence of the light ray on said lateral portion is close to the vertical first midplane (P1),
   wherein the input face has, in a third plane (X, Z), a concave profile forming a boss directed opposite to the output face,
   wherein in the third plane (X, Z), at least in a vicinity of the vertical first midplane (P1), and at a distance from the boss:
   the upper portion of the input face is substantially planar or has a very large radius of curvature, and
   the lower portion of the input face is substantially planar or has a very large radius of curvature and is not symmetrical to the upper portion with respect to the optical axis, and diverts incident rays received by the input face towards the optical axis, yet while keeping a downward inclination in the transmitted beam,
   wherein each of the lateral portions of the output face has a shape that is curved around a vertical axis, the concavity being directed towards the input face, and which has a radius of curvature, in a fourth plane (X, Y), that increases when getting away from the vertical midplane (P1).

2. The lens according to claim 1, wherein the boss is located in a vicinity of the optical axis.

3. The lens according to claim 1, wherein
   with regards to a symmetrical (S) of the upper portion with respect to the optical axis:
   the lower portion is shifted along the optical axis when getting away from the output face, an acute angle is formed between said lower portion and the optical axis is larger, or a combination thereof.

4. The lens according to claim 1, wherein the input face has a horse saddle type shape, the input face having, in a third plane (X, Y), a concave profile and, in a fourth plane (X, Z), a convex profile forming a boss directed opposite to the output face.

5. The lens according to claim 1, wherein the vertical first midplane (P1) is a plane of symmetry of the input face of the lens.

6. The lens according to claim 1, wherein the lower portion of the input face is configured to reduce the vertical opening angle (α) of the light beam with respect to the optical axis, according to the vertical axis (Z), so that the lower limit of the light beam inside the lens forms with the optical axis a first angle (α1) comprised between 15% and 40% of a second angle (α0) between the lower limit of an incident beam and the optical axis.

7. The lens according to claim 6, wherein the first angle (α1) is between 20% and 35% of the second angle (α0).

8. The lens according to claim 1, wherein the upper portion of the input face is further configured to reduce a horizontal opening angle (β) of the light beam, according to the transverse axis (Y).

9. The lens according to claim 1, wherein the lower portion of the input face is further configured to reduce the horizontal opening angle (β) of the light beam, according to the transverse axis (Y).

10. The lens according to claim 1, wherein the upper portion and the lower portion of the input face is further configured to reduce the horizontal opening angle (β) of the light beam, according to the transverse axis (Y).

11. The lens according to claim 1, wherein each of one or more lateral portions of the output face is further configured to modify the vertical opening angle (α) of the light beam with respect to the optical axis, according to the vertical axis (Z), between the horizontal second midplane (P2) and a lower limit.

12. The lens according to claim 1, wherein the vertical first midplane (P1) is a plane of symmetry of the output face of the lens, the horizontal second midplane (P2) is a plane of symmetry of the output face of the lens, or a combination thereof is a plane of symmetry of the output face of the lens.

13. A work light including a case and a plurality of light sources disposed in the case, wherein the work light comprises the lens according to claim 1 disposed opposite at least one of the light sources, on the path of the plurality of light rays emitted by said light source, and so that the optical axis of the lens is parallel to the main axis of emission of said light source.

14. A vehicle comprising at least one work light according to claim 13, the work light being mounted on the vehicle by a support configured to allow tilting the work light about a horizontal axis.

* * * * *